July 29, 1924.
R. A. HALL
SERVER
Filed June 6, 1923
1,503,363
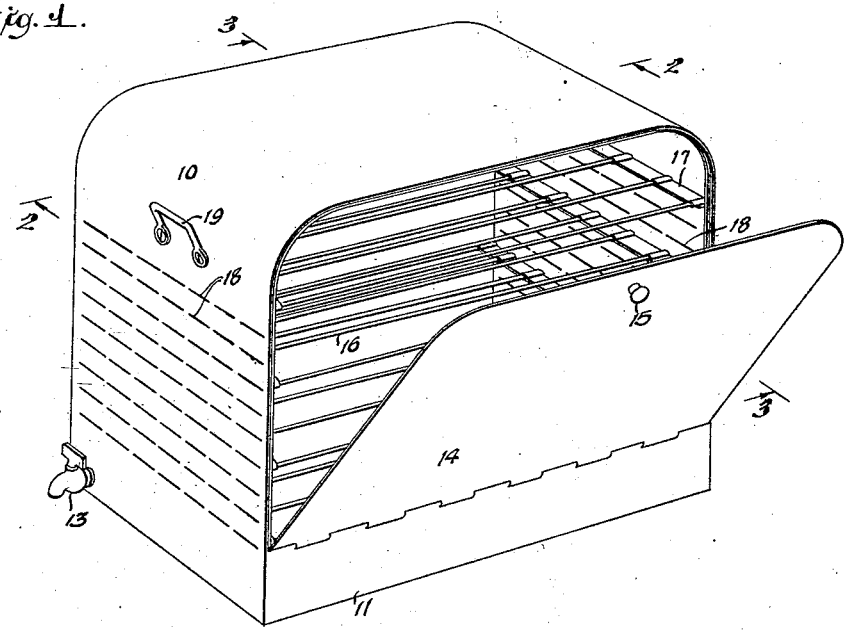
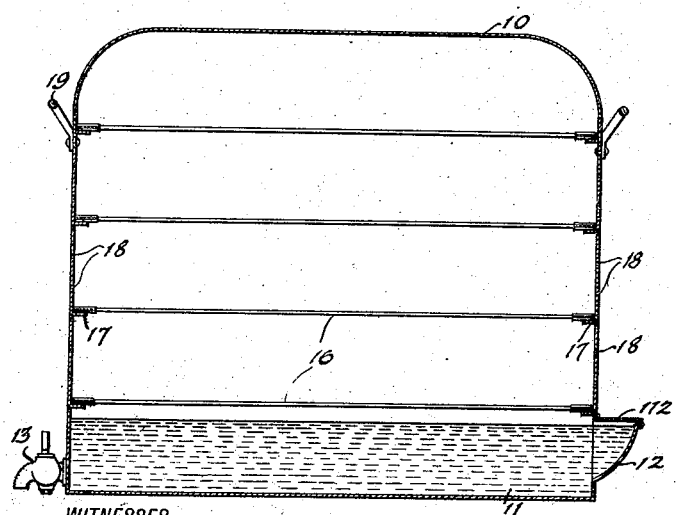
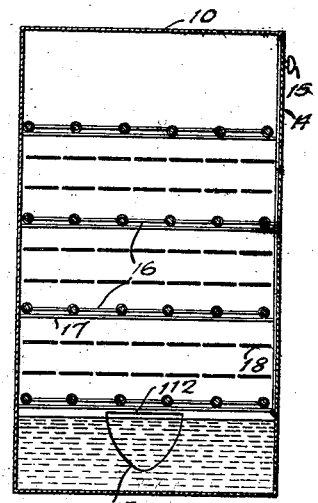
INVENTOR
REBECCA A. HALL Patented July 29, 1924.

1,503,363

UNITED STATES PATENT OFFICE.

REBECCA A. HALL, OF CINCINNATI, OHIO, ASSIGNOR OF ONE-HALF TO RUTH E. HALL, OF CINCINNATI, OHIO.

SERVER.

Application filed June 6, 1923. Serial No. 643,817.

*To all whom it may concern:*

Be it known that I, REBECCA A. HALL, a citizen of the United States of America, and a resident of Cincinnati, in the county of Hamilton and State of Ohio, have invented a new and Improved Server, of which the following is a description.

My invention relates to a device for use in serving dinners and the general object of the invention is to provide a server into which a complete course dinner or the major portions of the several dishes provided for the dinner may be placed and kept warm as well as maintained in a properly moistened condition, so that one may prepare a complete dinner with assurance that the dishes constituting the successive courses may be readily accessible in perfect condition to be served in sequence as required, a further object being to provide a server with means making for the convenient placing and removing of the various dishes.

The nature of the invention, its distinguishing features and advantages will clearly appear as the description proceeds.

Reference is to be had to the accompanying drawings forming a part of this specification, it being understood that the drawings are merely illustrative of one example of the invention.

Figure 1 is a perspective view of a server constructed in accordance with my invention, the door being shown partly open;

Figure 2 is a longitudinal vertical section as indicated by the line 2—2, Figure 1;

Figure 3 is a transverse vertical section as indicated by the line 3—3, Figure 1.

In carrying out my invention in practice the body 10 of the server is made in box-like form and at the bottom said body is formed with a water pan 11 which in practice may have suitable inlet for the water, there being shown an inlet well 12 at the outside of the body at one end and provided with a lift cover 112 into which water may be poured. Also, in practice I provide a drain cock 13 for the pan 11 at the opposite end from the inlet well 12. The front of the body 10 has a door 14 hinged at its lower edge at the top of a pan 11 and provided with a knob 15 or other suitable handle near the top edge.

Within the body 10 is provided a series of racks 16 one above another resting at their ends on ledges 17 rigid with the ends of the box so that the racks may be readily inserted and removed. The dishes of the several courses of a dinner are placed on separate racks so that the dishes pertaining to the respective courses may be readily removed in the proper sequence. The pan 11 receives hot water and may be set on the stove to generate sufficient steam to maintain the foods in a properly moist condition. The racks 16 are composed of longitudinal rods providing thereby the maximum circulation for the steam among the dishes on the several racks. In order that the steam may not collect to an undesirable extent on the foods on the different racks I form the ends of the body 10 with series of longitudinally ranging slots 18 between the several racks 16 so that the steam can find escape at both ends between pairs of racks, which arrangement is found effective in maintaining the foods in perfect condition. The body is provided with handles 19 at the opposite ends near the top for the convenient handling of the server.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claim.

Having thus described my invention, I claim:

A server of the class described, comprising a casing having a closed top and adapted to contain water in the lower portion thereof, a door on the body at the front and hingedly connected at its lower edge to the casing above the water level of the latter, a superimposed series of skeleton racks spaced apart in the casing, and said casing having openings in its end walls distributed throughout substantially their entire area above the water level and permitting unobstructed communication between the interior of the casing and the atmosphere.

REBECCA A. HALL.